United States Patent
Casillas et al.

(10) Patent No.: US 7,622,663 B2
(45) Date of Patent: Nov. 24, 2009

(54) KINESTHETIC MUSICAL INSTRUMENT POSITION TRAINER, CORRECTOR, AND UP-MOTION MUSCLE STRENGTHENER FOR FINGERS, HANDS, WRISTS, AND ARMS, AND PRACTICE DEVICE SIMULATOR

(76) Inventors: Mark J. Casillas, 33614 White Feather Rd., Acton, CA (US) 93510; Stephanie H. Casillas, 33614 White Feather Rd., Acton, CA (US) 93510

( * ) Notice: Subject to any disclaimer, the term of this patent is extended or adjusted under 35 U.S.C. 154(b) by 0 days.

(21) Appl. No.: 12/371,519

(22) Filed: Feb. 13, 2009

(65) Prior Publication Data
US 2009/0211432 A1    Aug. 27, 2009

Related U.S. Application Data

(60) Provisional application No. 61/075,003, filed on Jun. 23, 2008, provisional application No. 61/065,659, filed on Feb. 14, 2008.

(51) Int. Cl.
G10D 1/02    (2006.01)
(52) U.S. Cl. ...................................................... 84/281
(58) Field of Classification Search .............. 84/274, 84/280–282
See application file for complete search history.

(56) References Cited

U.S. PATENT DOCUMENTS 1,275,202 A    8/1918    Becker
2,239,579 A    8/1941    Solodar
2,477,365 A *  7/1949    Dissinger .................... 84/315
5,670,727 A    9/1997    Xiao

FOREIGN PATENT DOCUMENTS

WO    WO2007056809    5/2007

* cited by examiner

Primary Examiner—Kimberly R Lockett
(74) Attorney, Agent, or Firm—Sheppard, Mullin, Richter & Hampton LLP

(57) ABSTRACT

The present invention is embodied in a position training device for kinesthetic musical instrument instruction comprising an instrument component and a bow component. The instrument component comprises a main instrument shaft oriented along a main instrument axis and having a proximal end and a distal end, a chin piece attached to the proximal end of the main instrument shaft, and an instrument orthotic grip attached to the distal end of the main instrument shaft and oriented along the main instrument axis. The instrument orthotic grip has a thumb depression, an index finger depression, a middle finger depression, a ring finger depression, and a pinkie finger depression formed thereon. The bow component comprises a main bow shaft oriented along a main bow axis and having a first end and a second end, a bow orthotic grip attached to the first end of the main bow shaft and oriented along the main bow axis, and a bow tip piece attached to the second end of the main bow shaft. The bow orthotic grip has a thumb depression, an index finger depression, a middle finger depression, a ring finger depression, and a pinkie finger depression formed thereon. The bow component can be moved substantially perpendicularly relative to the instrument component in order to simulate the playing of a stringed musical instrument.

20 Claims, 8 Drawing Sheets

KINESTHETIC MUSICAL INSTRUMENT POSITION TRAINER, CORRECTOR, AND UP-MOTION MUSCLE STRENGTHENER FOR FINGERS, HANDS, WRISTS, AND ARMS, AND PRACTICE DEVICE SIMULATOR

CROSS-REFERENCE TO RELATED APPLICATION

Priority is claimed to U.S. Provisional Application Ser. No. 61/075,003, filed on Jun. 23, 2008, the contents of which are incorporated by reference in their entirety, and to U.S. Provisional Application Ser. No. 61/065,659, filed on Feb. 14, 2008, the contents of which are incorporated by reference in their entirety.

BACKGROUND OF THE INVENTION

This invention pertains generally to the field of position trainers and muscle strengtheners for musical instrument instruction and, more particularly, to a kinesthetic position trainer, corrector, and up-motion muscle strengthener for fingers, hands, wrists, and arms, the invention configured for use in the instruction of stringed musical instruments.

The concept of playing a violin may seem easy when viewed from an audience point of view. The musician is simply holding a violin, moving the bow back and forth, and generating different sounds as he or she moves his or her fingers along the neck. Beautiful melodies are created, and the whole concept seems simple.

The truth is that it takes years to master the violin. To get a great sound, the bow must be drawn at a perfect ninety-degree angle. The correct amount of pressure on the bow can only come from experience, otherwise a scratchy sound is emitted. Unlike a piano, where a note stays in tune until stopped, the violin requires a well-trained hand position and the correct placement of each finger in relation to the other fingers on the fingerboard. In short, playing the violin requires a musician to put his or her fingers, hands, wrists, and arms in many positions that might feel unnatural.

Violin teachers and makers have developed several devices to help students overcome these challenges. A problem with these devices is that they are not all-in-one devices that truly and realistically show students how to play a violin or other stringed instrument. They fail at being complete kinesthetic simulations of actual upper body position and movement.

For example, U.S. Pat. No. 1,275,202 to Becker discloses a violin practice device. The Becker device comprises a chin rest that incorrectly teaches a student to place his or her chin to the left of the violin neck. Most modern violinists believe the best position for the chin is in the middle of the violin, in line with the violin neck. Also, the Becker device has four buttons for each left-hand finger, but the buttons limit the device to use for down-motion finger exercises. The device is not compatible with finger exercises to teach horizontal, lateral, "stretch-out," and vibrato motion, or with a broad range of different tetrachord (four-finger) positions. Additionally, the Becker device does not show the student precisely where to place his or her left-hand thumb on the violin neck. The device thus does not teach students the correct way to hold the left hand and force it to come under the violin neck. Further, because the bow of the Becker device is a flat stick, the bow and bow guide of the Becker device are compatible only with back-forth and up-down movement, not rotational movement. The device thus does not allow the student to twist the bow and reproduce an accurate bow movement. Finally, the bow of the Becker device lacks guides for the right-hand fingers, and thus does not teach students where and how to place each finger around the bow. The bow has a thumb notch, but the thumb notch incorrectly teaches the student to place his or her right-hand wrist in back of the bow, not on top.

U.S. Pat. No. 2,239,579 to Solodar discloses a bowing instruction and practice device. The Solodar device is designed exclusively for teaching bow use and technique. The device does not teach the student where to place the thumb and fingers of the left hand. The bow of the Solodar device is limited to practicing ninety-degree bowing, and does not allow for practicing up-down movement. The bow lacks guides showing where to place the right-hand fingers, and is not a useful tool in teaching correct bowing technique.

U.S. Pat. No. 5,670,727 to Xiao discloses another bow practice device. The Xiao device is similar to the Solodar device, but the bow track on the Xiao device is configured to open up so that a student can place a real violin bow in track. In addition to the problems with the Solodar device, the Xiao device suffers from the additional problem that it will likely scratch or damage a good violin bow.

It should be appreciated from the foregoing description that there is a need for a position trainer and muscle strengthener configured for use in the instruction of stringed musical instruments that does not suffer from the problems described above. More specifically, there is a need for a kinesthetic upper-body position trainer, corrector, and up-motion muscle strengthener that correctly teaches a student to place his or her chin in line with the neck of the stringed instrument; is compatible with finger exercises to teach horizontal, lateral, "stretch-out," and vibrato motion; teaches students the correct way to hold the left hand and force it to come under the neck of the stringed instrument; allows the student to twist the bow and reproduce an accurate bow movement; allows for practicing up-down bow movement; teaches students where and how to place each finger around the bow; and does not require the use of a real bow. The present invention satisfies these needs and provides further related advantages.

SUMMARY OF THE INVENTION

The present invention is embodied in a position training device for kinesthetic musical instrument instruction comprising an instrument component and a bow component. The instrument component comprises a main instrument shaft oriented along a main instrument axis and having a proximal end and a distal end, a chin piece attached to the proximal end of the main instrument shaft, and an instrument orthotic grip attached to the distal end of the main instrument shaft and oriented along the main instrument axis. The instrument orthotic grip has a thumb depression, an index finger depression, a middle finger depression, a ring finger depression, and a pinkie finger depression formed thereon. The bow component comprises a main bow shaft oriented along a main bow axis and having a first end and a second end, a bow orthotic grip attached to the first end of the main bow shaft and oriented along the main bow axis, and a bow tip piece attached to the second end of the main bow shaft. The bow orthotic grip has a thumb depression, an index finger depression, a middle finger depression, a ring finger depression, and a pinkie finger depression formed thereon. The bow component can be moved substantially perpendicularly relative to the instrument component in order to simulate the playing of a stringed musical instrument. Although the position training device is described below in a right-handed configuration, it will be appreciated that a similar position training device could be configured in a left-handed configuration.

In one embodiment, the main instrument shaft has a substantially circular cross-section. The chin piece is oriented along a chin piece axis and is positioned substantially symmetrically about the main instrument axis. The instrument orthotic grip is substantially cylindrical. Each of the index finger depression, middle finger depression, ring finger depression, and pinkie finger depression formed on the instrument orthotic grip extends latitudinally around approximately 120 degrees to approximately 180 degrees of the instrument orthotic grip. Each of the index finger depression, middle finger depression, ring finger depression, and pinkie finger depression has a center point that is oriented approximately 85 to approximately 86 degrees about the main instrument axis relative to the chin piece axis. The index finger depression and the middle finger depression formed on the instrument orthotic grip are separated by a first ridge; the middle finger depression and the ring finger depression formed on the instrument orthotic grip are separated by a second ridge; and the ring finger depression and the pinkie finger depression formed on the instrument orthotic grip are separated by a third ridge. The instrument orthotic grip further has a thumb depression positioned approximately 160 degrees latitudinally around the instrument orthotic grip relative to the first ridge.

In another embodiment, the position training device further comprises a pair of bow guides received on the main instrument shaft and adjustable along at least a portion of the main instrument shaft.

In one embodiment, the main bow shaft has a substantially circular cross-section. The bow orthotic grip is substantially cylindrical. Each of the index finger depression, middle finger depression, and ring finger depression formed on the bow orthotic grip extends latitudinally around approximately 120 degrees to approximately 180 degrees, and most preferably around approximately 150 degrees, of the bow orthotic grip. The pinkie finger depression formed on the bow orthotic grip is positioned approximately 90 degrees latitudinally around the bow orthotic grip relative to each of the index finger depression, middle finger depression, and ring finger depression formed on the bow orthotic grip. The bow orthotic grip further has a thumb depression positioned approximately opposite the middle finger orthotic depression formed on the bow orthotic grip. Each of the index finger depression, middle finger depression, ring finger depression, and thumb depression formed on the bow orthotic grip are slanted to extend slightly longitudinally along the bow orthotic grip.

In another embodiment, the position training device further comprises a pair of bow stops received on the main bow shaft and adjustable along at least a portion of the main bow shaft.

In a further embodiment, the chin piece is replaced with an end piece that can be butted against a floor or other ground surface with the main instrument shaft extending generally vertically toward one of the user's shoulders, in order to simulate a cello or bass.

In yet a further embodiment, the chin piece is replaced with an arm piece having an arm piece axis oriented at an angle approximately 50 degrees to approximately 60 degrees, and most preferably approximately 55 degrees, relative to the main instrument axis.

The present invention is also embodied in a method for musical instrument instruction comprising the providing of an instrument component as described, the providing of a bow component as described, and the movement of the bow component substantially perpendicularly relative to the instrument component in order to simulate the playing of a stringed musical instrument.

The present invention thus provides several advantages. Because the chin rest bar is oriented generally symmetrically about the main instrument axis, the position training device correctly teaches a student to place his or her chin in line with the main instrument axis. The left-hand orthotic grip is compatible with finger exercises to teach horizontal, lateral, "stretch-out," and vibrato motion. It also has individual finger grips oriented with respect to the chin rest bar to teach students the correct way to hold the left hand and to force the left elbow to come beneath the left hand. The generally circular cross section of the main bow shaft allows the student to twist the bow and reproduce an accurate bow movement. The instrument component and the bow component are separate pieces, allowing the student to practice up-down bow movement. The right-hand orthotic grip teaches students where and how to place each finger of the right hand.

One object of this invention is to help students learn to play a stringed instrument through kinesthetic learning. The invention helps a student learn how and where to place and hold a stringed instrument under the student's chin, how and where to place the left thumb, how and where to place the left-hand fingers so correct notes can be played, how and where to place the left hand, how and where to place the right-hand thumb, how and where to place the right-hand fingers on the bow, how and where to place the bow in relationship to the strings, and how and where to move and articulate the bow.

Another object of this invention is to train music students through up-motion finger exercises that train the fingers to move vertically and horizontally, in order to teach the fingers how and where to play the right notes, and to teach the left hand the movement and shifting of violin positions and vibrato.

Another object of this invention is to teach the student how and where to place the bow of a stringed instrument, how to bend the wrist on up bows, and how to extend the wrist on down bows. Another object of this invention is to train the student in correct playing technique through a combination of finger exercise, rhythmic, and sing-and-play methods.

Another object of this invention is to kinesthetically show and have students feel the correct way to hold the bow of a stringed instrument, place the fingers on the bow, and move the bow at a ninety-degree angle.

Another object of this invention is to be an all-in-one device for teaching students how to correctly play a stringed instrument, and to show them what it feels like to play a violin, viola, cello, bass, or guitar. The invention can be used for education, sports, and rehabilitation, or modified to be a computer input device for gaming or education. The invention can be sized for students of different ages.

Another object of this invention is to be a learning, training, and strengthening tool for the fingers, hands, wrists, and arms. The invention can be made of wood, plastic, or other suitable materials, and can be formed through carving, molding, or other suitable techniques.

Other features and advantages of the present invention should become apparent from the following description of the preferred embodiments, taken in conjunction with the accompanying drawings, which illustrate, by way of example, the principles of the invention.

DETAILED DESCRIPTION OF THE PREFERRED EMBODIMENTS

Position Training Device

Figure 1:
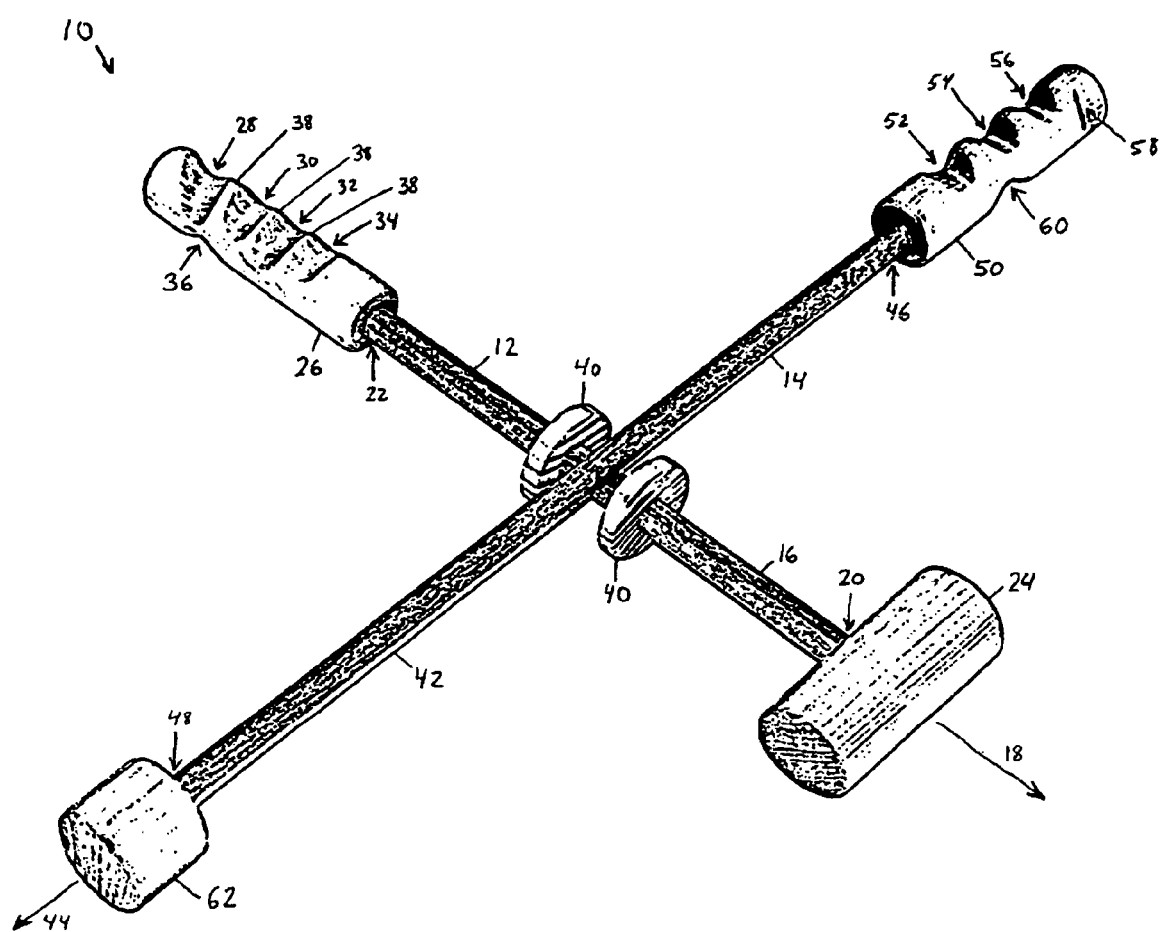
FIG. 1 is a perspective view of a position training device for kinesthetic musical instrument instruction, in accordance with an embodiment of the present invention.
Figure 2:
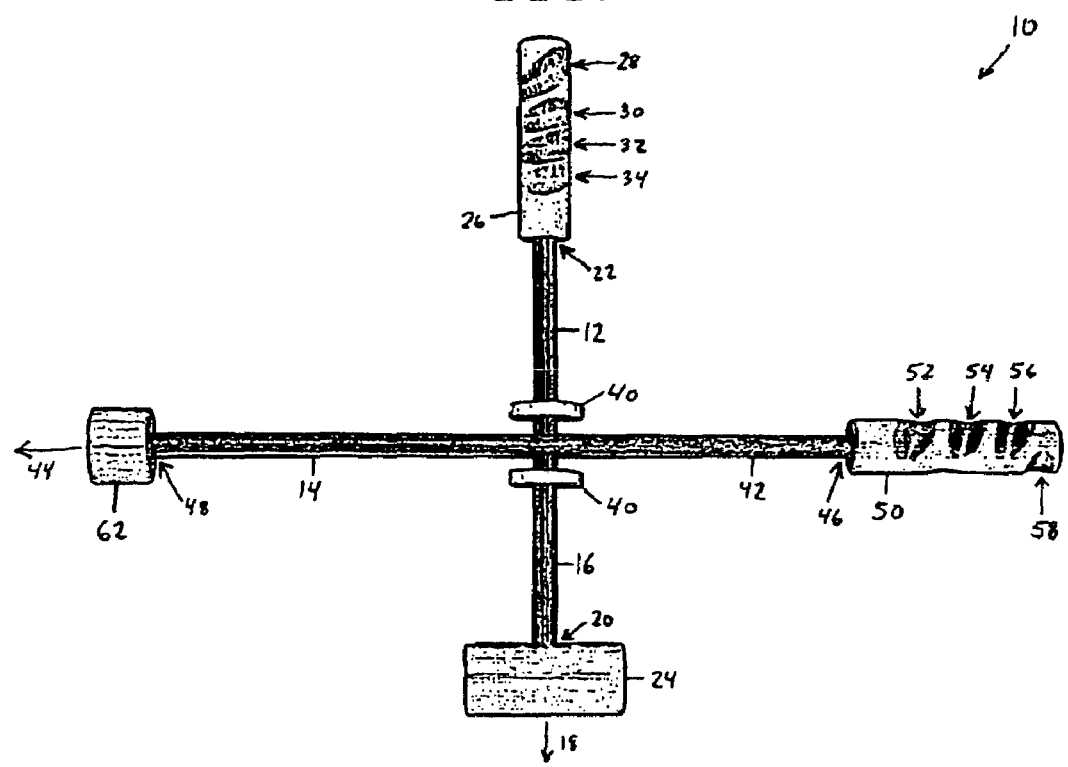
FIG. 2 is a top plan view of the position training device of FIG. 1.
Figure 3:
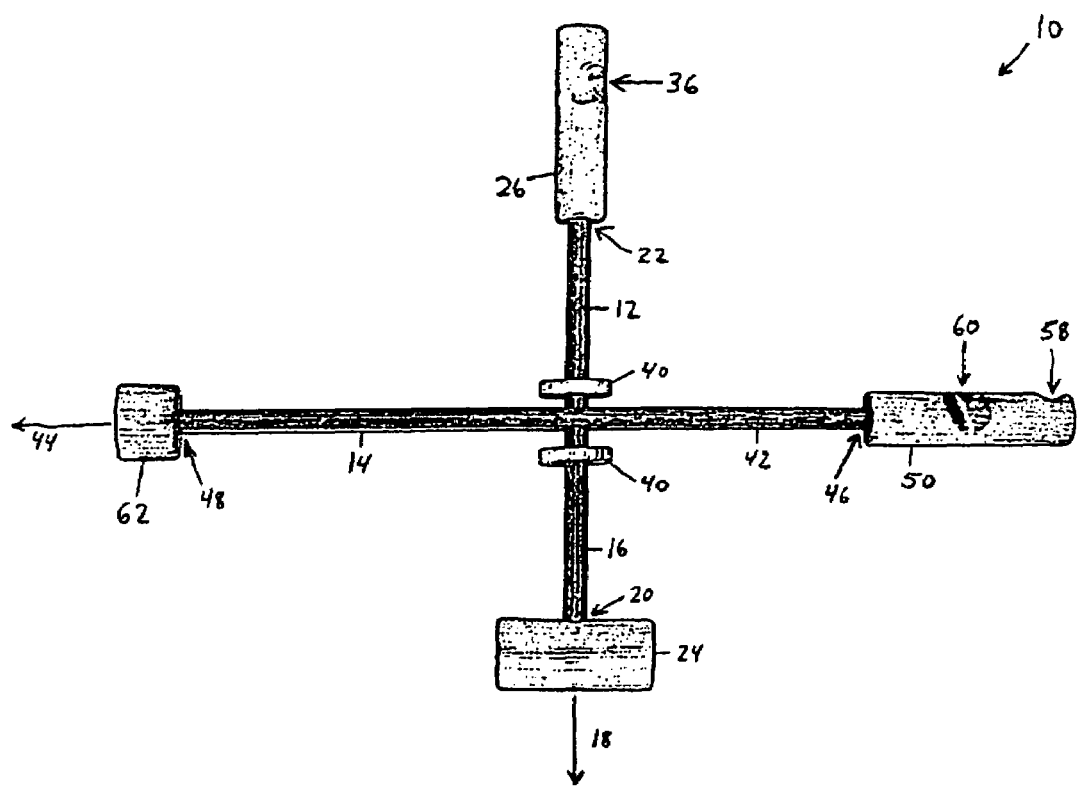
FIG. 3 is a bottom plan view of the position training device of FIG. 1.
Figure 4:
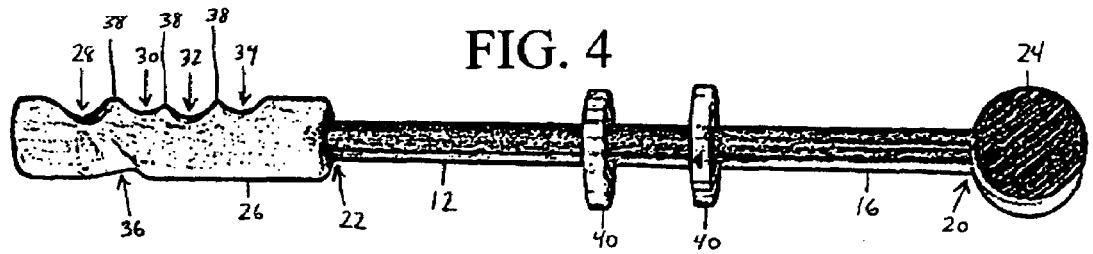
FIG. 4 is a left side elevation view of the instrument component of the position training device of FIG. 1.
Figure 5:
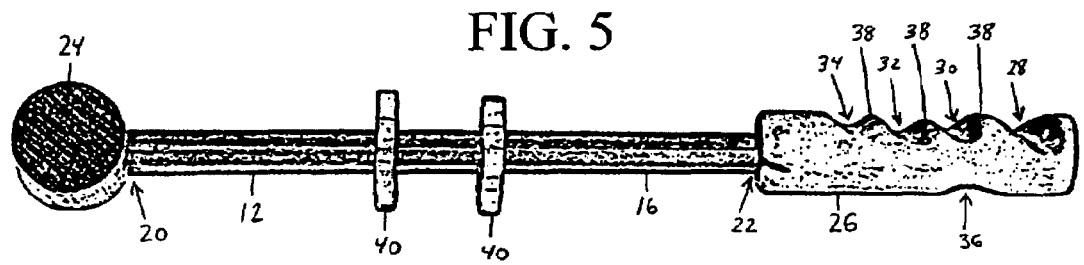
FIG. 5 is a right side elevation view of the instrument component of the position training device of FIG. 1.
Figure 6:
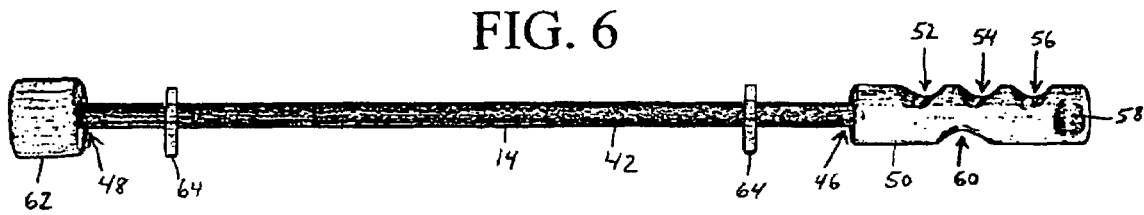
FIG. 6 is an inward side elevation view of the bow component of the position training device of FIG. 1.
Figure 7:
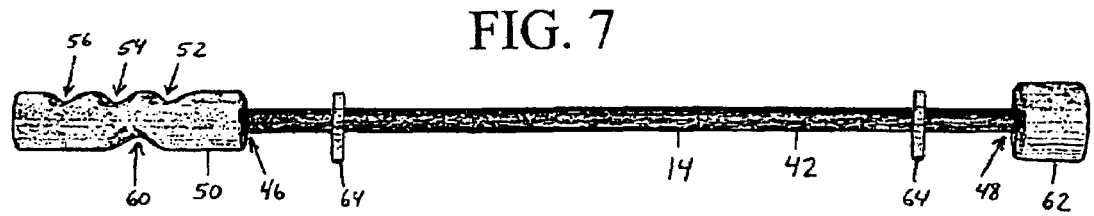
FIG. 7 is an outward side elevation view of the bow component of the position training device of FIG. 1.

With reference to FIGS. 1-7 there is shown a position training device 10 for kinesthetic musical instrument instruction, in accordance with an embodiment of the present invention. The position training device comprises an instrument component 12 and a bow component 14. Although the position training device is described in a right-handed configuration, it will be appreciated that a similar position training device could be configured in a left-handed configuration.

The instrument component 12 is configured to teach a user to correctly position the left fingers, hand, wrist, and arm for playing a violin. The instrument component has a main instrument shaft 16 oriented along a main instrument axis 18. The main instrument shaft has a proximal end 20 and a distal end 22. In one embodiment, the main instrument shaft is a wooden dowel having a generally circular cross-section. It represents a violin body.

A chin hold bar 24 is attached to the proximal end 20 of the main instrument shaft 16 and is oriented generally perpendicular to and symmetrically about the main instrument axis 18. In one embodiment, the chin hold bar is a wooden cylinder having a generally circular cross section. A hole can be made in the side of the chin hold bar for attaching the main instrument shaft.

A unidirectional left-hand orthotic grip 26 is attached to the distal end 22 of the main instrument shaft 16 and is oriented along the main instrument axis 18. In one embodiment, the left-hand orthotic grip is a wooden cylinder having an index finger orthotic depression 28, a middle finger orthotic depression 30, a ring finger orthotic depression 32, a pinkie finger orthotic depression 34, and a thumb orthotic depression 36. The orthotic depressions are carved, molded, or otherwise formed in the left-hand orthotic grip to guide the left fingers, hand, wrist, and arm into the correct position for playing the violin. A hole can be made in the side of the left-hand orthotic grip for attaching the main instrument shaft.

The finger orthotic depressions 28, 30, 32 and 34 extend generally latitutinally around approximately 120 degrees to approximately 180 degrees of the left-hand orthotic grip 26, allowing the user to practice lateral movement of the left-hand fingers and to simulate the playing of different strings. The finger orthotic depressions are each separated by ridges 38 that allow the user to practice horizontal and "stretch-out" movement of the left-hand fingers, and to simulate the playing of half-step notes. The thumb orthotic depression 36 is positioned generally opposite the index finger orthotic depression 28 and middle finger orthotic depression 30, such that the center of the thumb orthotic depression is positioned approximately 160 degrees in a counterclockwise direction (as viewed by the user) around the left-hand orthotic grip relative to the centers of these finger orthotic depressions. All of the orthotic depressions are oriented with respect to the chin hold bar 24 to teach the user the correct way to hold the left hand and to force the left elbow to come beneath the left hand. In one embodiment, the left-hand orthotic grip 26 is rotated approximately 4 to approximately 5 degrees counterclockwise (as viewed by the user) with respect to the chin hold bar, in order to achieve an optimal placement of the left hand and arm.

A pair of bow guides 40 are received on the main instrument shaft 16 and are adjustable along at least a portion of the main instrument shaft. In one embodiment, the bow guides are wooden disks, each having a hole formed in the center and sized to accommodate the main instrument shaft. The bow guides are configured to facilitate the proper ninety-degree orientation of the bow component 14 with the instrument component 12.

The bow component 14 is configured to teach a user to correctly position the right fingers, hand, wrist, and arm for playing a violin, and to facilitate the correct movement of the right hand and arm. The bow component has a main bow shaft 42 oriented along a main bow axis 44. The main bow shaft has a first end 46 and a second end 48. In one embodiment, the main bow shaft is a wooden dowel having a generally circular cross-section. It represents a violin bow.

A unidirectional right-hand orthotic grip 50 is attached to the first end 46 of the main bow shaft 42 and is oriented along the main bow axis 44. In one embodiment, the right-hand orthotic grip is a wooden cylinder having an index finger orthotic depression 52, a middle finger orthotic depression 54, a ring finger orthotic depression 56, a pinkie finger orthotic depression 58, and a thumb orthotic depression 60. The orthotic depressions are carved, molded, or otherwise formed in the right-hand orthotic grip to guide the right fingers, hand, wrist, and arm into the correct position for playing the violin. A hole can be made in the side of the right-hand orthotic grip for attaching the main bow shaft.

The index finger orthotic depression 52, middle finger orthotic depression 54, and ring finger orthotic depression 56 extend generally latitudinally around approximately 120 degrees to approximately 180 degrees, and most preferably around approximately 150 degrees, of the right-hand orthotic grip 50. In one embodiment, these orthotic depressions are tilted to extend slightly longitudinally, so that the ends farthest from the user are slightly farther from the main bow shaft 42 than the ends closest to the user. This configuration assists in guiding the fingers to the correct position for playing the violin. The pinkie finger orthotic depression 58 is positioned approximately ninety degrees in a clockwise direction (as viewed looking from the second end 48 toward the first end 46 of the main bow shaft 42) around the right-hand orthotic grip relative to the centers of the index finger orthotic depression, middle finger orthotic depression, and ring finger orthotic depression. This configuration assists in guiding the pinkie finger to the correct position on the side of the bow component 14. The thumb orthotic depression 60 is positioned approximately opposite the middle finger orthotic depression, slightly offset longitudinally toward the index finger orthotic depression. Like the index finger orthotic depression, middle finger orthotic depression, and ring finger orthotic depression, the thumb orthotic depression is tilted to extend slightly longitudinally, so that the end farthest from the user is slightly farther from the main bow shaft than the end closest to the user.

A bow tip piece 62 is attached to the second end 48 of the main bow shaft 42. In one embodiment, the bow tip piece is a wooden cylinder. A hole can be made in the side of the bow tip piece for attaching the main bow shaft. The bow tip adds weight to the bow component 14, balancing the weight of the right-hand orthotic grip 50 and improving the feel of the bow component.

An optional pair of bow stops 64 (FIGS. 6 and 7) can be received on the main bow shaft 42 and be adjustable along at least a portion of the main bow shaft. In one embodiment, the bow stops are wooden disks, each having a hole formed in the center and sized to accommodate the main bow shaft. The bow stops facilitate bowing exercises by variably limiting the range of movement of the bow component.

Although the position training device 10 is described in a violin configuration, it will be appreciated that a similar position training device could be configured for use in the instruction of other stringed instruments, such as the viola, cello, bass, and guitar. Also, similar to the way in which real stringed instruments can be constructed in fractional sizes, the position training device can be sized according to the age of the user, including 1/32, 1/16, 1/8, 1/10, 1/4, 1/2, 3/4 and 4/4 sizes.

To use the position training device 10, the user places the chin hold bar 24 of the instrument component 12 under the user's chin, around the user's collar bone area. The user then lifts up the user's left hand as if the user were going to catch a ball. Next, the user places the thumb orthotic depression 36 onto the user's left thumb. The user then brings the user's left hand around the unidirectional left-hand orthotic grip 26 and places each left-hand finger into one of the finger orthotic depressions 28, 30, 32 and 34. The user should place the left-hand fingers on their tips so that the left elbow can move to the right and forward, simulating proper violin technique and position.

Next, the user places the user's right thumb onto the thumb orthotic depression 60 of the right-hand orthotic grip 50. The user then places each right-hand finger into one of the finger orthotic depressions 52, 54, 56 and 58. Next, the user places the main bow shaft 42 between the pair of bow guides 40 received on the main instrument shaft 16. The user can then move the bow component 14 back and forth, simulating the playing of a violin. The bow guides 40 facilitate the proper ninety-degree movement of the bow component with respect to the instrument component 12.

The position training device 10 thus can function as a violin practice device simulator, as well as a finger, hand, wrist, and arm strengthener and exerciser. The position training device can be easily adapted to function as a finger, hand, wrist, and arm strengthener and exerciser for instruments other than stringed instruments, including percussion instruments. The position training device is compatible with finger gymnastics (finger exercises that have become standard for violinists over the centuries), which focus on up-motion finger exercises.

Figure 8:
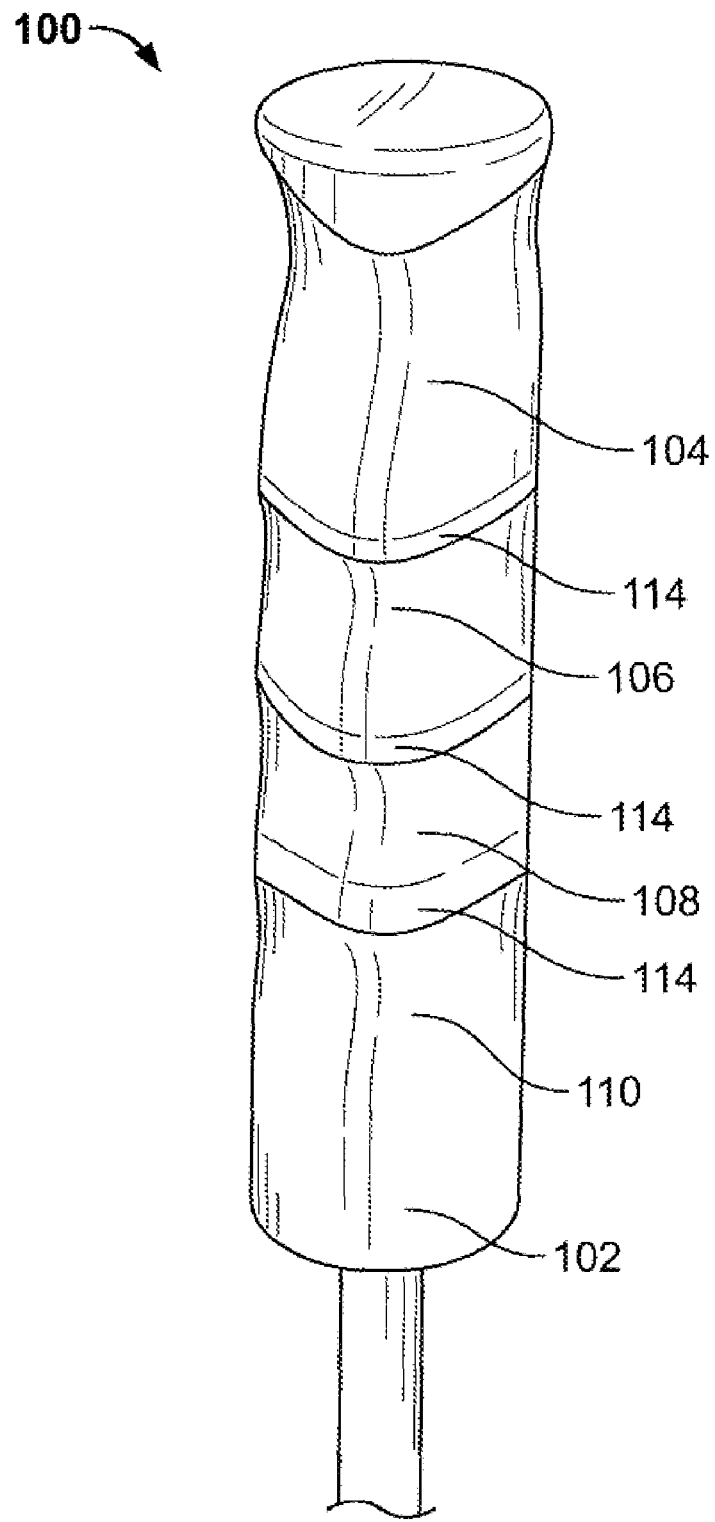
FIG. 8 is a front elevation view of a bidirectional orthotic grip, in accordance with an embodiment of the present invention.
Figure 9:
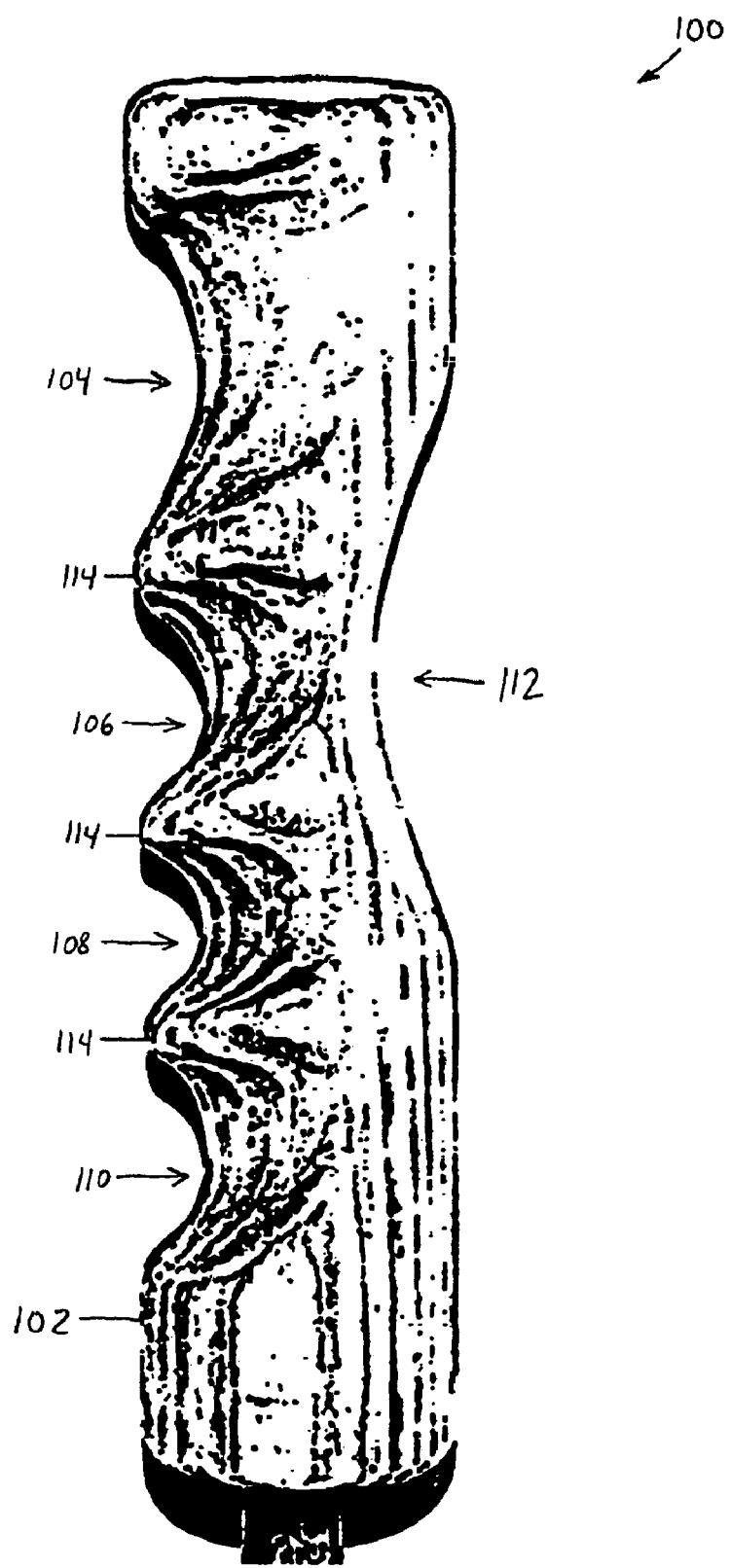
FIG. 9 is a side elevation view of a bidirectional orthotic grip, in accordance with an embodiment of the present invention.

With reference to FIGS. 8 and 9, there is shown a bidirectional orthotic grip 100, in accordance with an embodiment of the present invention. The bidirectional orthotic grip can be used in place of the unidirectional left-hand orthotic grip 26 in the position training device 10, in order to provide a convenient bidirectional orthotic grip for muscle development of both right and left fingers, hands, wrists, and arms.

In one embodiment, the bidirectional orthotic grip 100 is a wooden cylinder having, on a forward side 102, an index finger orthotic depression 104, a middle finger orthotic depression 106, a ring finger orthotic depression 108, and a pinkie finger orthotic depression 110. A thumb orthotic depression 112 is positioned approximately opposite the middle finger orthotic depression. The thumb orthotic depression has a significant longitudinal extent, so that a portion of the thumb orthotic depression is positioned opposite the index finger orthotic depression and another portion of the thumb orthotic depression is positioned opposite the ring finger orthotic depression. The orthotic depressions are carved, molded, or otherwise formed in the bidirectional orthotic grip. A hole can be made in the side of the bidirectional orthotic grip for attaching the main instrument shaft 16.

Each of the finger orthotic depressions 104, 106, 108 and 110 extends generally latitudinally around approximately 180 degrees of the bidirectional orthotic grip 100. Longitudinally, each of these orthotic depressions has a slight U-shape, such that the centers of the orthotic depressions are slightly closer to the main instrument shaft 16 than the ends of the orthotic depressions. The orthotic depressions are each separated by ridges 114.

Figure 10:
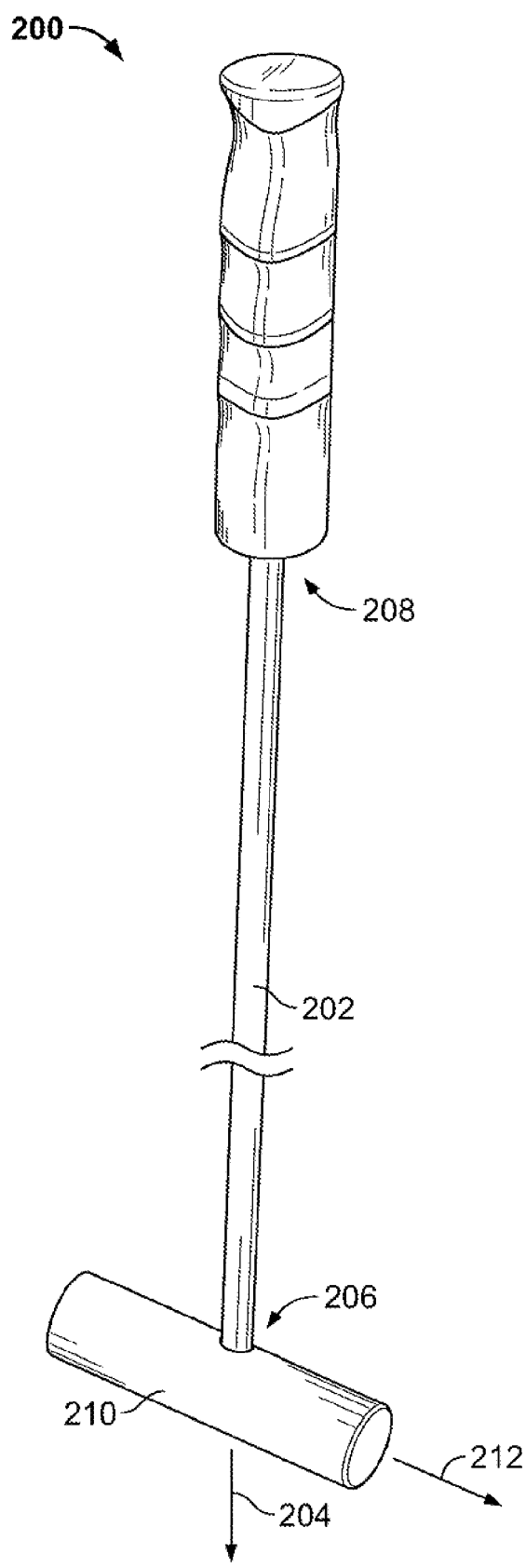
FIG. 10 is a perspective view of an instrument component configured for guitar instruction, in accordance with an embodiment of the present invention.

With reference to FIG. 10, there is shown an instrument component 200 configured for guitar instruction, in accordance with an embodiment of the present invention. The instrument component has a main instrument shaft 202 oriented along a main instrument axis 204. The main instrument shaft has a proximal end 206 and a distal end 208. In one embodiment, the main instrument shaft is a wooden dowel having a generally circular cross-section. It represents the body of a guitar.

An arm hold bar 210 is attached to the proximal end 206 of the main instrument shaft 202. In one embodiment, the bar is a wooden cylinder having a generally circular cross section. A hole can be made in the side of the bar for attaching the main instrument shaft. The bar has an axis 212 that is oriented preferably at approximately a 50- to 60-degree angle, and most preferably at approximately a 55-degree angle, relative to the main instrument axis 204. Thus oriented, the bar can be held in the crook of the user's arm with the main instrument shaft extending generally horizontally across the user's body, in order to simulate a guitar.

A bidirectional orthotic grip, such as the bidirectional orthotic grip 100, is attached to the distal end 208 of the main instrument shaft 202 and is oriented along the main instrument axis 204. Because a bidirectional orthotic grip is used, the instrument component can be easily rotated to switch between left- and right-hand training.

Figure 11:
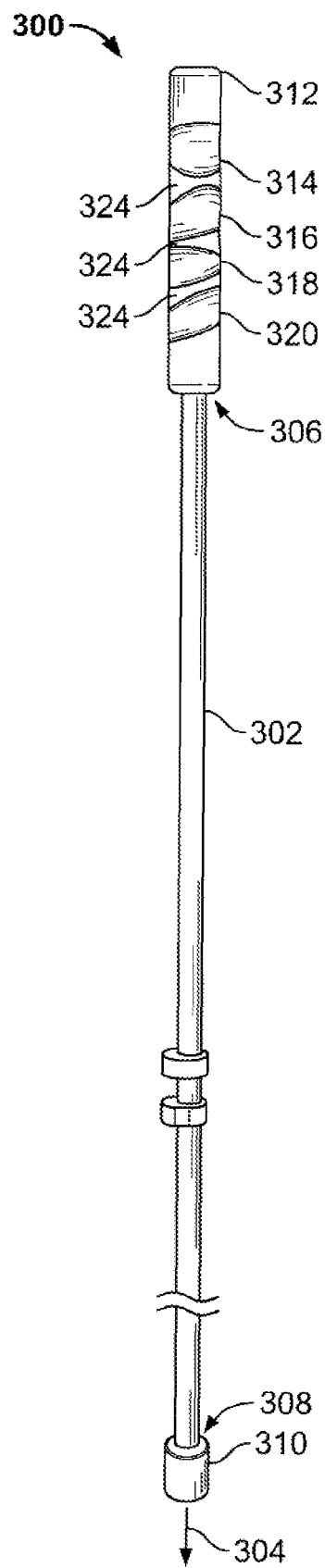
FIG. 11 is a front elevation view of an instrument component configured for cello or bass instruction, in accordance with an embodiment of the present invention.
Figure 12:
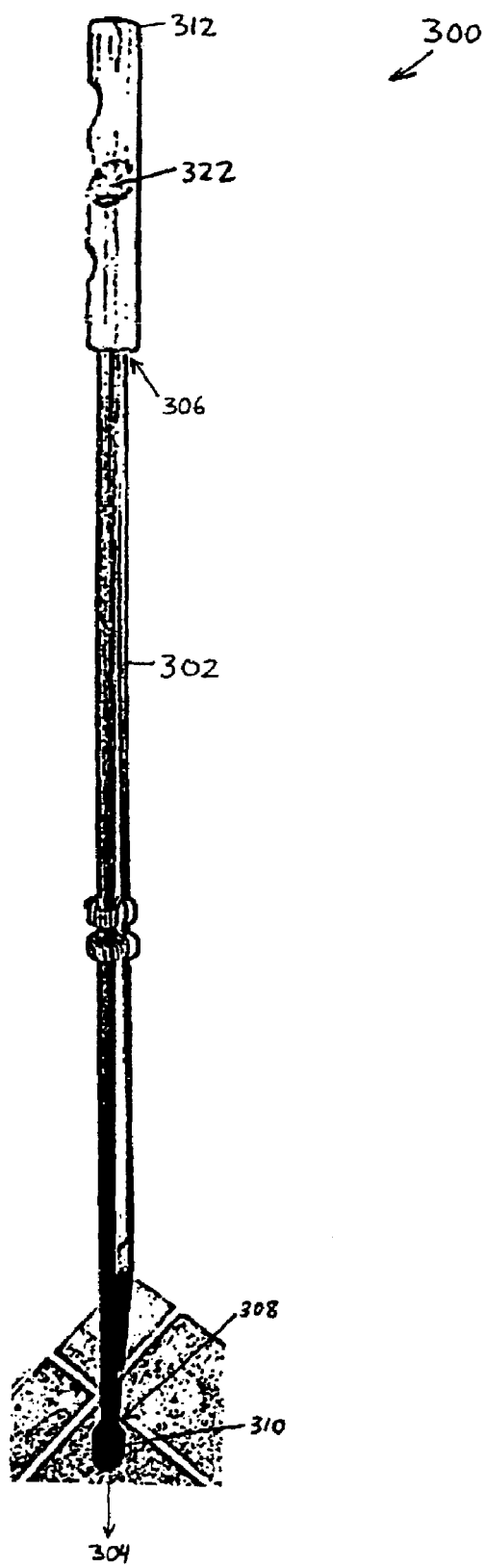
FIG. 12 is a rear elevation view of the instrument component of FIG. 11.

With reference to FIGS. 11 and 12, there is shown an instrument component 300 configured for cello or bass instruction, in accordance with an embodiment of the present invention. The instrument component has a main instrument shaft 302 oriented along a main instrument axis 304. The main instrument shaft has a top end 306 and a bottom end 308. In one embodiment, the main instrument shaft is a wooden dowel having a generally circular cross-section. It represents the body of a cello or bass.

An end stop 310 is attached to the bottom end 308 of the main instrument shaft 302. In one embodiment, the end stop is a wooden cylinder having a generally circular cross section. A hole can be made in the top of the end stop for attaching the main instrument shaft. The end stop can be butted against a floor or other ground surface with the main instrument shaft extending generally vertically toward one of the user's shoulders, in order to simulate a cello or bass.

A unidirectional left-hand orthotic grip 312 is attached to the top end 306 of the main instrument shaft 302 and is oriented along the main instrument axis 304. In one embodiment, the left-hand orthotic grip is a wooden cylinder having an index finger orthotic depression 314, a middle finger orthotic depression 316, a ring finger orthotic depression 318, a pinkie finger orthotic depression 320, and a thumb orthotic depression 322. The orthotic depressions are carved, molded, or otherwise formed in the left-hand orthotic grip to guide the left fingers, hand, wrist, and arm into the correct position for playing the cello or bass. A hole can be made in the side of the left-hand orthotic grip for attaching the main instrument shaft.

The finger orthotic depressions 314, 316, 318 and 320 extend generally latitutinally around approximately 120 degrees to approximately 180 degrees of the left-hand orthotic grip 26, allowing the user to practice lateral movement of the left-hand fingers and to simulate the playing of different strings. The finger orthotic depressions are each separated by ridges 324 that allow the user to practice vertical and "stretch-out" movement of the left-hand fingers, and to simulate the playing of half-step notes. The thumb orthotic depression 322 is positioned generally opposite the middle finger orthotic depression 316, such that the center of the thumb orthotic depression is positioned approximately 160 degrees in a counterclockwise direction (as viewed by the user) around the left-hand orthotic grip relative to the centers of these finger orthotic depressions.

An optional pair of bow guides 312 can be received on the main instrument shaft 302 and be adjustable along at least a portion of the main instrument shaft. The instrument component 300 can be used with an appropriately sized bow component 14 to simulate the playing of a cello or bass.

Production Specifications

The position training device 10 may be produced in various configurations and sizes according to the specifications described below. When drilling holes, natural variations in the diameter of the dowels used should be taken into consideration. A 64th higher or lower on drill bit size may be required. The left-hand orthotic grip 26 and right-hand orthotic grip 50 are copies made from a master shape and duplicarved to match the original. A center hole is then drilled at the top or bottom end. All holes are drilled to a depth of 16 millimeters, except for the bidirectional orthotic grip 100, in which the hole is drilled to a depth of ¾ inches. Sanding helps clean up flaws made in carving and smoothes out rough edges. Parts are glued together after being stained.

The left-hand orthotic grip 26:
Violin 4/4: 5-inch length, 1⅛-inch diameter dowel, drill 7/16-inch diameter bottom hole.
Violin ½: 5-inch length, 1-inch diameter dowel, drill 7/16-inch diameter bottom hole.
Violin 1/16: 4-inch length, 1-inch diameter dowel, drill 7/16-inch diameter bottom hole.
Cello 4/4: 8½-inch length, 35-millimeter diameter dowel, drill ⅝-inch diameter bottom hole.
Cello ½: 5½-inch length, 35-millimeter diameter dowel, drill ⅝-inch diameter bottom hole.
Guitar, bidirectional grip: 6-inch length, 35 millimeter diameter dowel, drill 7/16-inch diameter bottom hole.

The right-hand orthotic grip 50:
Violin 4/4: 5½-inch length, 35-millimeter diameter dowel, drill ⅜-inch diameter top hole.
Violin ½: 5-inch length, 1⅛ inch diameter dowel, drill ⅜-inch diameter top hole.
Violin 1/16: 4-inch length, 1-inch diameter dowel, drill ⅜-inch diameter top hole.
Cello 4/4: 6-inch length, 35-millimeter diameter dowel, drill ½-inch diameter top hole.
Cello ½: 5-inch length, 35 millimeter diameter dowel, drill ½-inch diameter top hole.

The main instrument shaft 16:
Violin 4/4: 14-inch length, 7/16-inch diameter dowel.
Violin ½: 12-inch length, 7/16-inch diameter dowel.
Violin 1/16: 9-inch length, 7/16-inch diameter dowel.
Cello 4/4: 48-inch length, ⅝-inch diameter dowel.
Cello ½: 39-inch length, ⅝-inch diameter dowel.
Guitar: 22-inch length, 7/16-inch diameter dowel.

The main bow shaft 42:
Violin 4/4: 610-millimeter length, ⅜-inch diameter dowel.
Violin ½: 487-millimeter length, ⅜-inch diameter dowel.
Violin 1/16: 352-millimeter length, ⅜-inch diameter dowel.
Cello 4/4: 610-millimeter length, ½-inch diameter dowel.
Cello ½: 610-millimeter length, ½-inch diameter dowel.

The bow guides 40:
Violin 4/4: 35-millimeter diameter, ½-inch length dowel, drill 7/16-inch diameter center hole.
Violin ½: 35-millimeter diameter, ½-inch length dowel, drill 7/16-inch diameter center hole.
Violin 1/16: 35-millimeter diameter, ½-inch length dowel, drill 7/16-inch diameter center hole.
Cello 4/4: 35-millimeter diameter, ⅝-inch length dowel, drill ⅝-inch diameter off-center hole.
Cello ½: 35-millimeter diameter, ⅝-inch length dowel, drill ⅝-inch diameter off-center hole.

The bow stops 64:
Violin 4/4: 35-millimeter diameter, ½-inch length dowel, drill ⅜-inch diameter center hole.
Violin ½: 35-millimeter diameter, ½-inch length dowel, drill ⅜-inch diameter center hole.
Violin 1/16: 35-millimeter diameter, ½-inch length dowel, drill ⅜-inch diameter center hole.
Cello 4/4: 35-millimeter diameter, ½-inch length dowel, drill ½-inch diameter center hole.

The chin hold bar 24 (or arm or leg hold bar 210):
Violin 4/4: 35-millimeter diameter, 108-millimeter length dowel, drill 7/16-inch diameter center hole.
Violin ½: 35-millimeter diameter, 90-millimeter length dowel, drill 7/16-inch diameter center hole.
Violin 1/16: 35-millimeter diameter, 3-inch length dowel, drill 7/16-inch diameter center hole.
Cello 4/4: 35-millimeter diameter, 1½-inch length dowel, drill ½-inch diameter center hole.
Guitar: 35-millimeter diameter, 5-inch length dowel, drill 7/16-inch diameter center hole at 55-degree angle.

The bow tip piece 62:
Violin 4/4: 35-millimeter diameter, 32-millimeter length dowel, drill ⅜-inch diameter center hole.
Violin ½: 35-millimeter diameter, 27-millimeter length dowel, drill ⅜-inch diameter center hole.
Violin 1/16: 35-millimeter diameter, 27-millimeter length dowel, drill ⅜-inch diameter center hole.
Cello 4/4: 35-millimeter diameter, 1½-inch length dowel, drill ½-inch diameter center hole.

The left-hand orthotic grip 26, right-hand orthotic grip 50, chin hold bar 24 (or arm or leg hold bar 210), and bow tip piece 62 can be finished according to the following process: Sponge on Watco Danish Oil, "Fruitwood" color (add a touch of "natural" to weaken the color as desired), and let dry for 24 to 72 hours. Next, polish the pieces as needed with a 320 grit green wave disc on a 2-inch circular drill sander with an extra-soft velcro foam base. Then, wipe on a blend of varnish comprising two parts General Finishes Arm-R-Seal Gloss to one part General Finishes Arm-R-Seal Semi-Gloss, and let dry for 24 to 72 hours. Polish as needed.

The bow guides 40 and bow stops 64 can be finished according to the following process: Sponge on a blend of Watco Danish Oil comprising two parts "Fruitwood" color to one part "natural" color (add more "natural" to weaken the color as desired), and let dry for 24 to 72 hours. Next, polish the pieces as needed with a 320 grit green wave disc on a 2-inch circular drill sander with an extra-soft velcro foam base. Then, wipe on a blend of varnish comprising two parts General Finishes Arm-R-Seal Gloss to one part General Finishes Arm-R-Seal Semi-Gloss, and let dry for 24 to 72 hours. Polish as needed.

The main instrument shaft 16 and main bow shaft 42 can be finished according to the following process: Remove labels and residue using Paint Thinner brush-on application. Hand sand the pieces with 400-grit sandpaper. Next, sponge on Varathane Wood Stain, "light cherry" color, and let dry for 12 to 36 hours. Hand sand the pieces with 400-grit sandpaper as needed. Then, wipe on a blend of primer coat comprising three parts Parks Pro Finish Poly Gloss to one part paint thinner to one half to one part "light cherry" stain as desired for color, and let dry for 12 to 24 hours. Hand sand with 400-grit sandpaper to smooth as necessary. Next, wipe on a blend of finishing coat comprising two parts Varathane Interior Poly Gloss to two parts paint thinner to one part "light cherry" stain.

Although the invention has been described in detail with reference only to the presently preferred embodiments, those skilled in the art will appreciate that various modifications can be made without departing from the invention. Accordingly, the invention is defined only by the following claims.

What is claimed is:

1. A position training device for musical instrument instruction comprising:
    an instrument component comprising
        a main instrument shaft oriented along a main instrument axis and having a proximal end and a distal end,
        a chin piece attached to the proximal end of the main instrument shaft, and
        an instrument orthotic grip attached to the distal end of the main instrument shaft and oriented along the main instrument axis, the instrument orthotic grip having an index finger depression, a middle finger depression, a ring finger depression, and a pinkie finger depression formed thereon; and
    a bow component comprising
        a main bow shaft oriented along a main bow axis and having a first end and a second end,
        a bow orthotic grip attached to the first end of the main bow shaft and oriented along the main bow axis, the bow orthotic grip having an index finger depression, a middle finger depression, a ring finger depression, and a pinkie finger depression formed thereon, and
        a bow tip piece attached to the second end of the main bow shaft;
    wherein the bow component can be moved substantially perpendicularly relative to the instrument component in order to simulate the playing of a stringed musical instrument.

2. The position training device of claim 1, wherein the chin piece is positioned substantially symmetrically about the main instrument axis.

3. The position training device of claim 1, wherein:
    the instrument orthotic grip is substantially cylindrical; and
    each of the index finger depression, middle finger depression, ring finger depression, and pinkie finger depression formed on the instrument orthotic grip extends latitudinally around approximately 120 degrees to approximately 180 degrees of the instrument orthotic grip.

4. The position training device of claim 3, wherein:
    the chin piece is oriented along a chin piece axis;
    each of the index finger depression, middle finger depression, ring finger depression, and pinkie finger depression has a center point that is oriented approximately 85 to approximately 86 degrees about the main instrument axis relative to the chin piece axis.

5. The position training device of claim 3, wherein:
    the index finger depression and the middle finger depression formed on the instrument orthotic grip are separated by a first ridge;
    the middle finger depression and the ring finger depression formed on the instrument orthotic grip are separated by a second ridge; and
    the ring finger depression and the pinkie finger depression formed on the instrument orthotic grip are separated by a third ridge.

6. The position training device of claim 5, wherein:
    the instrument orthotic grip further has a thumb depression positioned approximately 160 degrees latitudinally around the instrument orthotic grip relative to the first ridge.

7. The position training device of claim 1, further comprising a pair of bow guides received on the main instrument shaft and adjustable along at least a portion of the main instrument shaft.

8. The position training device of claim 1, wherein the main bow shaft has a substantially circular cross-section.

9. The position training device of claim 1, wherein:
    the bow orthotic grip is substantially cylindrical; and
    each of the index finger depression, middle finger depression, and ring finger depression formed on the bow orthotic grip extends latitudinally around approximately 120 degrees to approximately 180 degrees of the bow orthotic grip.

10. The position training device of claim 9, wherein each of the index finger depression, middle finger depression, and ring finger depression formed on the bow orthotic grip extends latitudinally around approximately 150 degrees of the bow orthotic grip.

11. The position training device of claim 9, wherein the pinkie finger depression formed on the bow orthotic grip is positioned approximately 90 degrees latitudinally around the bow orthotic grip relative to each of the index finger depression, middle finger depression, and ring finger depression formed on the bow orthotic grip.

12. The position training device of claim 9, wherein the bow orthotic grip further has a thumb depression positioned approximately opposite the middle finger orthotic depression formed on the bow orthotic grip.

13. The position training device of claim 12, wherein each of the index finger depression, middle finger depression, ring finger depression, and thumb depression formed on the bow orthotic grip are slanted to extend slightly longitudinally along the bow orthotic grip.

14. The position training device of claim 1, further comprising a pair of bow stops received on the main bow shaft and adjustable along at least a portion of the main bow shaft.

15. A position training device for musical instrument instruction comprising:
an instrument component comprising
a main instrument shaft oriented along a main instrument axis and having a top end and a bottom end,
an end piece attached to the bottom end of the main instrument shaft, and
an instrument orthotic grip attached to the top end of the main instrument shaft and oriented along the main instrument axis, the instrument orthotic grip having an index finger depression, a middle finger depression, a ring finger depression, and a pinkie finger depression formed thereon; and
a bow component comprising
a main bow shaft oriented along a main bow axis and having a first end and a second end,
a bow orthotic grip attached to the first end of the main bow shaft and oriented along the main bow axis, the bow orthotic grip having an index finger depression, a middle finger depression, a ring finger depression, and a pinkie finger depression formed thereon, and
a bow tip piece attached to the second end of the main bow shaft;
wherein the bow component can be moved substantially perpendicularly relative to the instrument component in order to simulate the playing of a stringed musical instrument.

16. The position training device of claim 15, wherein:
the instrument orthotic grip is substantially cylindrical; and
each of the index finger depression, middle finger depression, ring finger depression, and pinkie finger depression formed on the instrument orthotic grip extends latitudinally around approximately 120 degrees to approximately 180 degrees of the instrument orthotic grip.

17. The position training device of claim 16, wherein:
the index finger depression and the middle finger depression formed on the instrument orthotic grip are separated by a first ridge;
the middle finger depression and the ring finger depression formed on the instrument orthotic grip are separated by a second ridge; and
the ring finger depression and the pinkie finger depression formed on the instrument orthotic grip are separated by a third ridge.

18. The position training device of claim 17, wherein:
the instrument orthotic grip further has a thumb depression positioned approximately 160 degrees latitudinally around the instrument orthotic grip relative to the middle finger depression.

19. The position training device of claim 1, further comprising a pair of bow guides received on the main instrument shaft and adjustable along at least a portion of the main instrument shaft.

20. A position training device for musical instrument instruction, the position training device comprising:
a main instrument shaft oriented along a main instrument axis and having a first end and a second end,
an arm piece attached to the first end of the main instrument shaft and having an arm piece axis oriented at an angle approximately 50 degrees to approximately 60 degrees relative to the main instrument axis, and
an instrument orthotic grip attached to the second end of the main instrument shaft and oriented along the main instrument axis, the instrument orthotic grip having an index finger depression, a middle finger depression, a ring finger depression, and a pinkie finger depression formed thereon.

* * * * *